Sept. 5, 1972  F. C. WERNER  3,689,280
CENTER-FILLED COOKIE MAKING APPARATUS AND METHOD
Filed Dec. 28, 1970  2 Sheets-Sheet 1
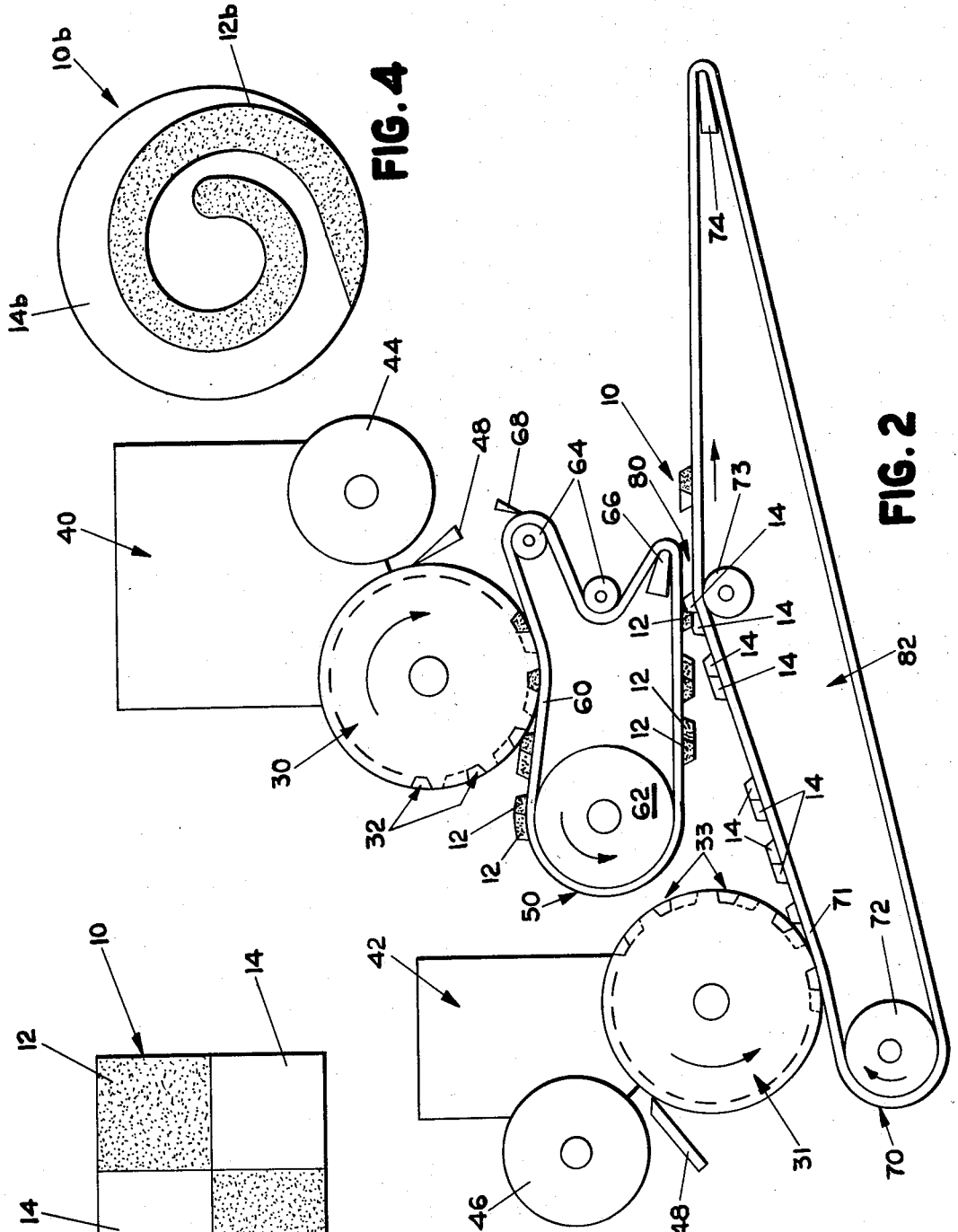
INVENTOR.
FRANK CHARLES WERNER
BY
ATTORNEYS

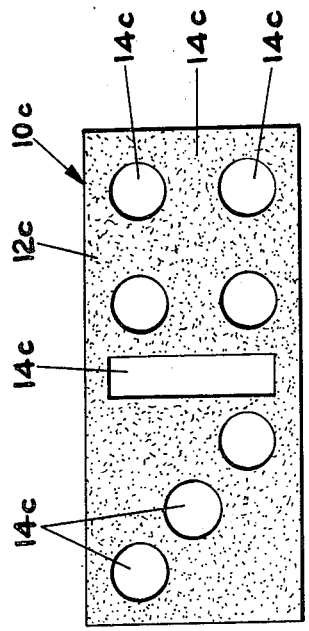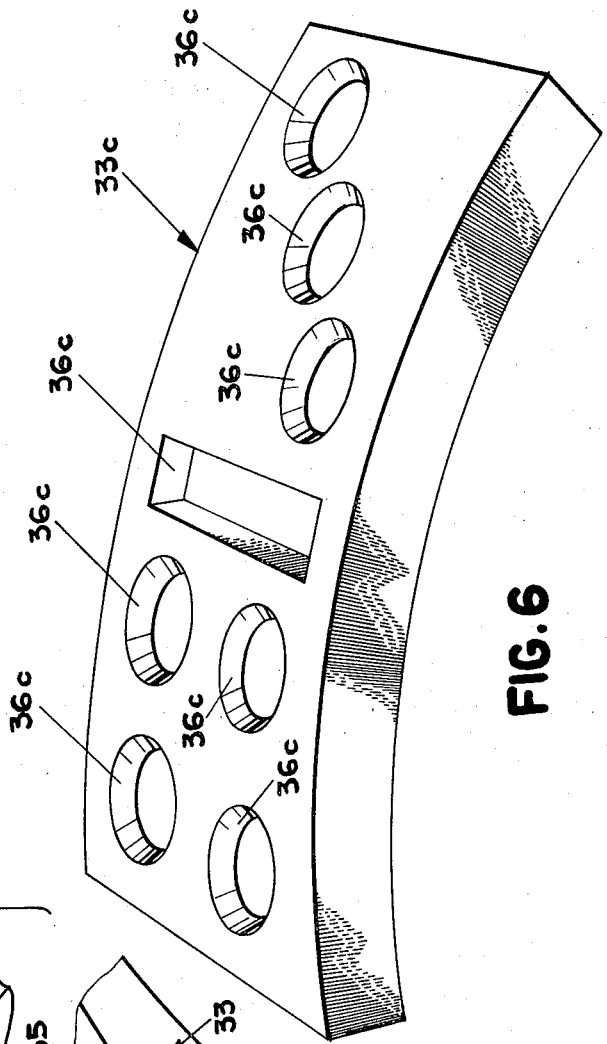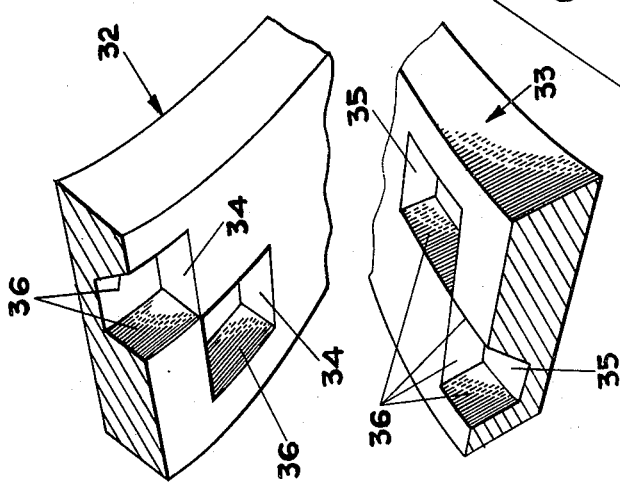

United States Patent Office 3,689,280
Patented Sept. 5, 1972

3,689,280
CENTER-FILLED COOKIE MAKING APPARATUS AND METHOD
Frank Charles Werner, Grand Rapids, Mich., assignor to Werner Lehara Incorporated, Grand Rapids, Mich.
Filed Dec. 28, 1970, Ser. No. 101,952
Int. Cl. A21d 8/00
U.S. Cl. 99—86        14 Claims

ABSTRACT OF THE DISCLOSURE

Apparatus and process for producing dough products having at least two portions each characterized by a different flavor or ingredient throughout. The apparatus provides in combination two die rollers for molding the two different portions separately, an inverting mechanism for inverting one of the portions, and means for superimposing the inverted portions upon those portions not inverted, to complete the product.

BACKGROUND OF THE INVENTION

One popular type of cookie today is the mosaic cookie of the type shown in FIGS. 1, 4 and 5 of the drawings included herewith. These cookies are made of more than one type dough. One dough portion might be chocolate flavored while another dough portion might be vanilla flavored. Cakes and other dough products have similarly been made with different dough portions.

Heretofore, such mosaic dough products have been made only by hand. The different dough portions are superimposed, one on top of the other to make a bar, the cross section of which has different flavored dough portions or dough portions varying in some other manner. Slices of the bar are then cut off along the cross section in order to produce the individual cookies.

In conventional cookie making machinery, rotary dies are used to deposit the cookies on a conveying belt. The dough in a die recess is pressed against the conveying belt and is deposited on the conveying belt. Since the dough must be pressed against a belt, it can not be pressed against a lower dough portion and it is not possible to use this machinery to practice the superposition method described above.

Furthermore, the die portions of the die roller must have slanted sides, generally slanted at about 7°, in order to effectuate a release of a molded cookie from the die. Thus, it is not possible to use such die rollers to position different cookie portions closely adjacent each other on a belt. The inclined sides of the molded dough portions make it difficult if not impossible to weld the separate dough portions together into a single cookie. Thus, at present mosaic cookies or cakes can be manufactured only by hand.

SUMMARY OF THE INVENTION

The present invention provides a method and apparatus which facilitate the automatic production of such mosaic cookies. First and second dough portions of different types of dough are separately molded, and then the first dough portions are inverted and positioned adjacent the second dough portions such that the sides of the dough portions contact each other. Because of the inversion, the sloped walls of the first dough portions, which are necessary to achieve release from the molding means, will matingly abut and contact the sloped walls of the second die portions.

It is also an object of this invention to utilize a conveyor as the inverting means. The first dough portions are deposited on a first conveyor which passes vertically through 180° such that a portion of its path is inverted. The first conveyor is adapted to hold the first dough portions even in this inverted position. A second conveyor is provided upon which the second dough portions are deposited. The first and second conveyors converge at a point where the first conveyor is inverted; and at this point, the dough portions which are deposited on the first conveyor are removed therefrom.

It is a further object of this invention to utilize first and second die rollers for molding the first and second dough portions respectively. These rollers are positioned adjacent the first and second conveyors respectively, and they have die segments whose orientations on the first and second rollers respectively are complementary. In this manner, by operating the die rollers and the first and second conveyors at the same rates, the first and second die portions will automatically align at the point where the first and second conveyors converge.

In accordance with this invention, it is possible to make mosaic cookies of all types. The die segments of the first and second dies can have identical complementary configurations. The die segments of one die roller can be larger than those of another and can have protrusions corresponding to the reliefed areas of the other such that the final cookie will include first dough portions completely surrounded by second dough portions or vice versa. In another example, the die segments could be complementary spirals to create a mosaic cookie such as that shown in FIG. 4.

BRIEF DESCRIPTION OF THE DRAWINGS

These and other objects and advantages of the invention will be seen and understood by reference to the specification and appended drawings wherein:

FIG. 1 is a plan view of a cookie which can be produced according to the invention;

FIG. 2 is a schematic elevational view of the apparatus constructed in accordance with this invention;

FIG. 3 is a fragmentary perspective view illustrating the complementary orientation of the die segments of the first and second die rollers;

FIG. 4 is a plan view of an alternative cookie which can be produced in accordance with this invention;

FIG. 5 is a plan view of an alternative cookie which can be produced in accordance with this invention;

FIG. 6 is a perspective, fragmentary view of a portion of one of the die rollers which would be utilized in producing the cookie of FIG. 5.

PREFERRED EMBODIMENT

In the preferred embodiment, the dough portions 12 of cookie 10 (FIG. 1) are produced on a first die roller 30 while the second dough portions 14 of cookie 10 are produced on a second die roller 31 (FIG. 2). The first dough portions 12 might be chocolate while the second dough portions 14 might be vanilla. They might also be different types of dough merely because of different coloring, texturing or differences in other ingredients. The dough for first dough portions 12 is placed in hopper 40 from whence it is transferred to die roller 30. Hopper 42 provides a similar function in transferring the dough for second dough portions 14 to die roller 31. The molded first dough portions 12 are deposited on inverter conveyor 50 while the molded second dough portions 14 are deposited on a second conveyor 70 then converge at a forming station 80 at which the first dough portions 12 and second dough portions 14 are joined together.

The first and second die rollers 30 and 31 are conventional and are readily available in the industry. Die segments 32 are fastened to the circumference of first die roller 30 and die segments 33 are fastened to the circumference of second die roller 31 (FIG. 2). These die segments 32 and 33 are shown fragmentarily in FIG. 3, and include die recesses 34 and 35 respectively. As is known in the art, the side walls 36 of the die recesses 34 and 35 must be inclined slightly outwardly in order to facilitate the release of molded dough from the die segments. Generally, the walls 36 are inclined at approximately a 7° angle to the vertical. This slope has been exaggerated somewhat in the drawings for purposes of illustration.

The die recesses 34 and 35 are oriented such that they are complimentary in position. In this manner, the separately molded first and second dough portions 12 and 14 will align properly at forming station 80 in a manner to be hereinafter described.

Dough hoppers 40 and 42 are also conventional. Dough stored therein is pressed into die recesses 34 and 35 by means of pressure rollers 44 and 46 respectively (FIG. 2). Scrappers 48 are provided adjacent each die roller 30 and 31 such that excess dough is shaved off the surface of the die segments 32 and 33 in order to aid in the final shaping of the dough portions 12 and 14.

Inverter conveyor 50 comprises an endless belt 60 carried over a larger rubber roller 62, around a pair of smaller rubber rollers 64 and around a nosing bar 66 which facilitates an abrupt change in direction in the path followed by belt 60 (FIG. 2). As it passes over rubber roller 62, belt 60 passes vertically through 180° and thereby becomes inverted. Rubber roller 62 and the roller 64 are positioned to force belt 60 to press quite hard against die roller 30 such that a suction is created between belt 60 and the surface of a first dough portion 12. The basic function and operation of a comparable inverter conveyor is disclosed in U.S. patent application Ser. No. 19,666, filed on Mar. 16, 1970 and assigned to the same assignee as is the instant application.

First die roller 30 presses firmly against continuous belt 60 to insure proper molding of first dough portions 12. Additionally, the pressure of contact between first die roller 30 and belt 60 causes a suction, which in turn causes first dough portions 12 stick to belt 60 and to be withdrawn from die segments 32. Belt 60 then passes over roller 62, thereby traveling vertically through 180° to completely reverse its direction and become inverted. Because of the aforementioned suction, first dough portions 12 stick to belt 60 even after being inverted by passing around roller 62. In this manner, first dough portions 12 are brough to forming station 80 in an inverted condition.

To especially adapt the belt 60 to carry the cookie patties with the inner surface down, the belt 50 is made of a material such as canvas, or any other material which has a surface attraction for dough. For example, cotton belts are also usable. As the belt 50 is used in a continuous run, the dough attraction properties of the belt are enhanced by the formation of a dough film on the belt. Prior to the formation of this film, the attraction properties of the belt 50 can be enhanced by wetting the belt. While this film of dough is desirable, any dough in excess thereof is not desirable. According, a scrape blade 68 is used to scrape off excess quantities of dough and leave only a film thereof.

Take-up rollers 64 control the slack in the belt 60. So as to adjust the pressure exerted by die roller 30 against the die segments and the dough portions therein. Roller 62 is concentrically mounted upon a stationary shaft by roller bearings (not shown). The remainder of the support for the belt 60 comprises a nosing bar 66, which performs a function hereinafter described.

Second dough portions 14 are formed by second die roller 31 and are deposited onto a second conveyor 70. Second die roller 31 engages a continuous belt 71 with a slight amount of force such that suction is created at the point of contact to effectuate a release of second dough portions 12 and 14 from their die segments 33 on the circumference of second die roller 31. Continuous belt 71 passes over rollers 72 and 73 and around a nose bar 74. The path followed by belt 71 between rollers 72 and 73 is inclined slightly upwardly such that second dough portions 14 move towards inverter conveyor 50. At the forming station 80, belt 71 converges with belt 60 such that the distance between the two belts at this point is just slightly greater than the thickness of the first and second dough portions 12 and 14. In this manner, first dough portions 12 converge with second dough portions 14 at forming station 80 and are thereby joined together. As the combined first and second dough portions pass from forming station 80, the first dough portions 12 are separated from inverter conveyor belt 60 due to the fact that belt 60 sharply changes direction by passing over nose bar 66. The fully assembled cookie 10 then rests on second conveyor 70 and is conveyed to subsequent equipment for subsequent processing. Nose bar 74 provides a means of separating the formed cookie 10 from conveyor belt 71 is such separation is desired.

OPERATION

In operation, die rollers 30 and 31 are rotated at equivalent rates such that the first dough portions 12 are formed at the same rate as second dough portions 14. First dough portions 12 are deposited on inverter conveyor belt 60 while second dough portions 14 are deposited on second conveyor belt 71. Inverter conveyor 50 and second conveyor 70 are operated at the same rate, such that the first and second dough portions 12 and 14 which are formed at the same time will reach forming station 80 at the same time. A variable drive may be provided for either inverter conveyor 50 or second conveyor 70 in order to vary the rate of operation of one or the other of these conveyors as may be necessary to insure that dough portions formed simultaneously are joined together simultaneously at forming station 80.

The first dough portions 12 are inverted as belt 60 passes over roller 62. The inverted first dough portions 12 join second dough portions 14 at forming station 80, due to the fact that inverter conveyor 50 and second conveyor 70 converge at that point. Because first dough portions 12 are inverted, the inclined slope of their side edges mates perfectly with the inclined slope of the edges of second dough portions 14. Furthermore, such mating is facilitated by the fact that the die recesses 34 of first die segments 32 are complementarily oriented with respect to die recesses 35 of second die segment 33. Any slight imperfections in dough segment alignment can be taken care of by an inspector standing along the side of second conveyor 70 at the point where the formed cookies 10 leave forming station 80.

ALTERNATIVE EMBODIMENTS

FIGS. 4 and 5 illustrate alternative embodiments of the dough product which can be formed by the apparatus and process of this invention. Dough portions similar to those previously described bear the same reference numeral to which the distinguishing suffixes *b* and *c* have been added. Thus, in FIG. 4, the cookie 10*b*, is a roulade cake having a portion 14*b* such as a vanilla portion, and another flavored portion such as a chocolate portion 12*b*, each of the portions 12*b* and 14*b* spiraling in the fashion characteristic of a roulade cake. For this dough product, the portion 14*b* is produced by a suitably shaped die segment in second roller 31, while the portion 12*b* is produced by a suitably shaped die segment in first roller 30, the walls of each of the die segments being inclined in a manner heretofore described to facilitate mold release. Inverter conveyor 50 automatically insures that the angle of inclination of the side surfaces of portion 12*b* will mate the angle of inclination of the side surfaces of the portion 14*b*.

FIG. 5 illustrates a domino cookie 10*c* having circular portions 14*c* and a bar portion 14*c* formed out of one flavored material such as vanilla. The remainder of the cookie 10*c* comprises a different flavored portion 12*c* such as a chocolate portion. FIG. 6 illustrates a die segment 33*c* for producing the dough portions 14*c*, these portions comprising a plurality of disconnected elements. The die segments 33c are mounted on second roll 31. The die segments for mounting on roller 30 (not shown) for producing the dough portion 12c would comprise a rectangular relief with protrusions corresponding to the recesses of die segment 33c.

Yet other alternative embodiments are possible with this invention. For example, any mechanism for superimposing the inverted dough portions 12 upon the dough portions 14 will satisfy the requirements of this invention. Thus, it is not intended that the invention be limited to the particular embodiments herein disclosed, but rather it is intended that it cover all alternative arrangements, equivalents, and embodiments as may be included within the scope of the following claims.

The embodiments of the invention in which an exclusive property or privilege is claimed are defined as follows.

1. An apparatus for producing dough products having at least two different dough portions of different types of dough, said apparatus comprising: means for continuously and separately molding at least first and second dough portions so that said first and second dough portions are separated from each other during and after the molding process; said molding means having die recesses adapted to produce said first and second dough portions respectively, the walls of said die recesses being inclined outwardly to facilitate the release of a dough portion from a die recess; means for inverting said first dough portion; and means for positioning said inverted first dough portion adjacent said second dough portion such that the sloped sides of said first and second dough portions, as shaped by said inclined walls, will contact and mate with one another.

2. The apparatus of claim 1 in which said molding means comprises a first rotary die roller and a second, separate rotary die roller for each of said first and second dough portions respectively.

3. The apparatus of claim 1 in which said inverting means comprises a first conveyor upon which said first dough portions are deposited by said molding means; said first conveyor passing vertically through 180° such that it becomes inverted; said first conveyor being adapted to hold said first dough portions even along that portion of its path where it is inverted.

4. The apparatus of claim 3 in which a second conveyor passes from said molding means, and upon which said second dough portions are deposited by said molding means; said positioning means comprising: said first and second conveyors being arranged such that their paths converge at a point where said first conveyor is inverted; means being provided for removing said first dough portions from said first conveyor at said point of convergence.

5. The apparatus of claim 4 in which said first and second dough portions are deposited simultaneously on said first and second conveyors respectively, said first and second conveyors being operated at the same rate; said die recesses being oriented complimentarily with respect to each other such that said first and second dough portions are positioned on said first and second conveyors respectively for automatic mating at said point of convergence.

6. The apparatus of claim 2 in which said inverting means comprises an endless belt and means for pressing said belt against said first die roller, said belt being mounted so as to pass vertically through 180° and thereby reverse its direction after leaving said first die roller, thereby orienting said first dough portions in an inverted position with respect to their originally formed position.

7. A method for molding dough products having at least two different dough portions of different types of dough, said method comprising the steps of: continuously and separately molding said first and second dough portions such that said first and second dough portions are separated from each other; depositing said molded first dough portions on a conveyor which passes vertically through 180°; removing said first dough portions from said conveyor after it has passed through said 180° to become inverted; positions said first dough portions adjacent said second dough portions with their adjacent side edges in mating engagement.

8. The method of claim 7 in which said second dough portions are deposited on a second conveyor and moved into proximity with an inverted portion of said first conveyor; said step of removing said first dough portions from said inverted portion of said first conveyor being followed by positioning said first dough portions on said second conveyor adjacent said second dough portions.

9. An apparatus for producing dough products having at least two different dough portions of different types of dough, said apparatus comprising: means for continuously and separately molding at least first and second dough portions so that said first and second dough portions are separated from each other during and after the molding process; said molding means having die recesses adapted to produce said first and second dough portions respectively; means for inverting said first dough portion; and means for positioning said inverted first dough portion adjacent said second dough portion such that the sides of said first and second dough portions will contact and mate with one another.

10. The apparatus of claim 9 in which said molding means comprises a first rotary die roller and a second, separate rotary die roller for each of said first and second dough portions respectively.

11. The apparatus of claim 9 in which said inverting means comprises a first conveyor upon which said first dough portions are deposited by said molding means; said first conveyor passing vertically through 180° such that it becomes inverted; said first conveyor being adapted to hold said first dough portions even along that portion of its path where it is inverted.

12. The apparatus of claim 11 in which a second conveyor passes from said molding means, and upon which said second dough portions are deposited by said molding means; said positioning means comprising: said first and second conveyors being arranged such that their paths converge at a point where said first conveyor is inverted; means being provided for removing said first dough portions from said first conveyor at said point of convergence.

13. The apparatus of claim 12 in which said first and second dough portions are deposited simultaneously on said first and second conveyors respectively, said first and second conveyors being operated at the same rate; said die recesses being oriented complimentarily with respect to each other such that said first and second dough portions are positioned on said first and second conveyors respectively for automatic mating at said point of convergence.

14. The apparatus of claim 10 in which said inverting means comprises an endless belt and means for pressing said belt against said first die roller, said belt being mounted so as to pass vertically through 180° and thereby reverse its direction after leaving said first die roller, thereby orienting said first dough portions in an inverted position with respect to their originally formed position.

References Cited

UNITED STATES PATENTS

| | | | |
|---|---|---|---|
| 356,450 | 1/1887 | Coleman | 107—8 C |
| 1,869,232 | 7/1932 | Weiland | 107—8 C |
| 2,424,949 | 7/1947 | White | 107—1 J |
| 3,530,531 | 9/1970 | Posegate | 107—1 J |

PATRICK D. LAWSON, Primary Examiner

U.S. Cl. X.R.

99—234, 450.1; 425—220, 337, 373